(12) United States Patent
Fujii (10) Patent No.: US 10,514,041 B2
(45) Date of Patent: Dec. 24, 2019

(54) CENTRIFUGAL COMPRESSOR

(71) Applicant: KABUSHIKI KAISHA TOYOTA JIDOSHOKKI, Kariya-shi, Aichi-ken (JP)

(72) Inventor: Toshiro Fujii, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 165 days.

(21) Appl. No.: 15/746,021

(22) PCT Filed: Jul. 22, 2016

(86) PCT No.: PCT/JP2016/071614
§ 371 (c)(1),
(2) Date: Jan. 19, 2018

(87) PCT Pub. No.: WO2017/014316
PCT Pub. Date: Jan. 26, 2017

(65) Prior Publication Data
US 2018/0209435 A1    Jul. 26, 2018

(30) Foreign Application Priority Data

Jul. 23, 2015 (JP) .................. 2015-146178

(51) Int. Cl.
*F04D 29/10*    (2006.01)
*F04D 29/051*   (2006.01)
(Continued)

(52) U.S. Cl.
CPC ......... *F04D 29/104* (2013.01); *F04D 29/051* (2013.01); *F04D 29/057* (2013.01);
(Continued)

(58) Field of Classification Search
CPC .... F04D 29/104; F04D 29/051; F04D 29/057; F04D 29/102; F04D 29/0516;
(Continued)

(56) References Cited

U.S. PATENT DOCUMENTS 3,853,433 A * 12/1974 Roberts ............... F04D 17/125
                                              417/423.13
4,969,797 A * 11/1990 Takara ................... A47L 9/22
                                              15/339

(Continued)

FOREIGN PATENT DOCUMENTS

EP    0952412 A2 * 10/1999 .......... F04B 27/1804
JP    50-99345 U1    8/1975
(Continued)

OTHER PUBLICATIONS

International Preliminary Report on Patentability with the translation of Written Opinion dated Jan. 23, 2018 issued by the International Bureau in International Application No. PCT/JP2016/071614.
(Continued)

*Primary Examiner* — Nathaniel E Wiehe
*Assistant Examiner* — Latoia L Sudler
(74) *Attorney, Agent, or Firm* — Sughrue Mion, PLLC (57) ABSTRACT

A centrifugal compressor includes a rotation shaft, an impeller, a housing including a first chamber, a second chamber of which pressure is lower than the first chamber, and a partition wall that partitions the first chamber and the second chamber and includes a through hole through which the rotation shaft is inserted, and a seal member arranged in the housing. The seal member includes a gas seal and a support. When the rotation shaft is rotating, the gas seal surrounds an outer circumferential surface of the rotation shaft in a non-contact state in which dynamic pressure forms a gap between the gas seal and the outer circumferential surface of
(Continued)

the rotation shaft. The support supports the gas seal in a state in which the gas seal is movable in a direction intersecting an axial direction of the rotation shaft.

7 Claims, 4 Drawing Sheets

(51) Int. Cl.
| | | |
|---|---|---|
| $F04D\ 29/057$ | (2006.01) | |
| $F16C\ 17/04$ | (2006.01) | |
| $F16C\ 27/02$ | (2006.01) | |
| $F16C\ 33/74$ | (2006.01) | |
| $F16J\ 15/44$ | (2006.01) | |

(52) U.S. Cl.
CPC ............ F16C 17/045 (2013.01); F16C 27/02 (2013.01); F16C 33/748 (2013.01); F16J 15/441 (2013.01)

(58) Field of Classification Search
CPC ..... F16C 17/045; F16C 33/748; F16J 15/441; F04C 27/009
USPC .......................................................... 415/104
See application file for complete search history.

(56) References Cited

U.S. PATENT DOCUMENTS

| | | | | |
|---|---|---|---|---|
| 5,312,225 | A * | 5/1994 | Lorenzen | F04D 29/058 |
| | | | | 415/105 |
| 5,791,868 | A * | 8/1998 | Bosley | F01D 3/04 |
| | | | | 415/104 |
| 5,897,299 | A * | 4/1999 | Fukunaga | F04D 29/057 |
| | | | | 417/310 |
| 6,375,438 | B1 * | 4/2002 | Seo | F04D 17/12 |
| | | | | 415/111 |
| 7,690,887 | B2 * | 4/2010 | Takahashi | F04D 17/12 |
| | | | | 415/100 |
| 8,800,310 | B2 * | 8/2014 | Sugitani | F04D 17/122 |
| | | | | 415/100 |
| 9,500,227 | B2 * | 11/2016 | Chen | F04D 29/0513 |
| 2007/0069597 | A1 * | 3/2007 | Taniguchi | F04D 29/057 |
| | | | | 310/90.5 |
| 2009/0140495 | A1 * | 6/2009 | Dreifert | F04C 27/009 |
| | | | | 277/431 |
| 2009/0220338 | A1 * | 9/2009 | Ietka | F04D 29/052 |
| | | | | 415/229 |
| 2009/0257895 | A1 * | 10/2009 | Takado | F04D 29/051 |
| | | | | 417/423.12 |
| 2012/0219439 | A2 | 8/2012 | Takado et al. | |
| 2015/0267717 | A1 * | 9/2015 | Fujii | F04D 19/002 |
| | | | | 415/220 |
| 2016/0061210 | A1 * | 3/2016 | Hasegawa | F04D 29/058 |
| | | | | 62/498 |

FOREIGN PATENT DOCUMENTS

| | | | |
|---|---|---|---|
| JP | 3-78596 A | 4/1991 | |
| JP | 3-130971 U1 | 12/1991 | |
| JP | 2000-310342 A | 11/2000 | |
| JP | 2007-162493 A | 6/2007 | |
| JP | 2007-270651 A | 10/2007 | |
| JP | 2009-257165 A | 11/2009 | |
| JP | 2011202641 A * | 10/2011 | ......... F04D 29/0516 |
| JP | 2016102480 A * | 6/2016 | |

OTHER PUBLICATIONS

International Search Report for PCT/JP2016/071614 dated Oct. 25, 2016 [PCT/ISA/210].

* cited by examiner

Fig.5

CENTRIFUGAL COMPRESSOR

CROSS REFERENCE TO RELATED APPLICATIONS

This application is a National Stage of International Application No. PCT/JP2016/071614 filed Jul. 22, 2016, claiming priority based on Japanese Patent Application No. 2015-146178 filed Jul. 23, 2015, the contents of all of which are incorporated herein by reference in their entirety.

TECHNICAL FIELD

The present invention relates to a centrifugal compressor.

BACKGROUND ART

Patent document 1 describes an example of a centrifugal compressor including a rotation shaft, an impeller rotated by the rotation of the rotation shaft to compress fluid, and a housing that accommodates the rotation shaft and the impeller. The rotation shaft is rotationally supported by a bearing including a top foil and a bump foil that elastically supports the top foil.

PRIOR ART DOCUMENT

Patent Document

Patent Document 1: Japanese Laid-Open Patent Publication No. 2009-257165

SUMMARY OF THE INVENTION

Problems that are to be Solved by the Invention

The housing may include a first chamber and a second chamber that differ in fluid pressure and a partition wall that partitions the first chamber and the second chamber. The partition wall includes a through hole through which the rotation shaft is inserted. In this case, fluid may leak through the through hole from the first chamber, which has a high pressure, toward the second chamber, which has a low pressure.

For example, a seal member may be used to limit the leakage of fluid from the high-pressure first chamber toward the low-pressure second chamber. In this case, vibration, displacement of the center of gravity of the rotation shaft, or the like may oscillate the rotation shaft resulting in an axial runout that lowers the sealing performance of the seal member.

It is an object of the present invention to provide a centrifugal compressor that limits the leakage of fluid through the through hole from the first chamber toward the second chamber even when an axial runout of a rotation shaft occurs.

Means for Solving the Problem

A centrifugal compressor that solves the above problem includes a rotation shaft, an impeller that compresses fluid when rotated by rotation of the rotation shaft, a housing that accommodates the rotation shaft and the impeller, the housing including a first chamber, a second chamber of which pressure is lower than the first chamber, and a partition wall that partitions the first chamber and the second chamber and includes a through hole through which the rotation shaft is inserted, and a seal member arranged in the housing. The seal member restricts a flow of fluid through the through hole from the first chamber toward the second chamber. The rotation shaft traverses both of the first chamber and the second chamber through the through hole. The seal member includes a gas seal and a support. When the rotation shaft is rotating, the gas seal surrounds an outer circumferential surface of the rotation shaft from an outer side in a radial direction of the rotation shaft in a non-contact state in which dynamic pressure generated during the rotation of the rotation shaft forms a gap between the gas seal and the outer circumferential surface of the rotation shaft. The support supports the gas seal in a state in which the gas seal is movable in a direction intersecting an axial direction of the rotation shaft.

EMBODIMENTS OF THE INVENTION

One embodiment of a centrifugal compressor will now be described with reference to the drawings. In the present embodiment, the centrifugal compressor is installed in a vehicle. To facilitate understanding, a rotation shaft 12 is shown in side views in FIG. 1 and the like.

Figure 1:
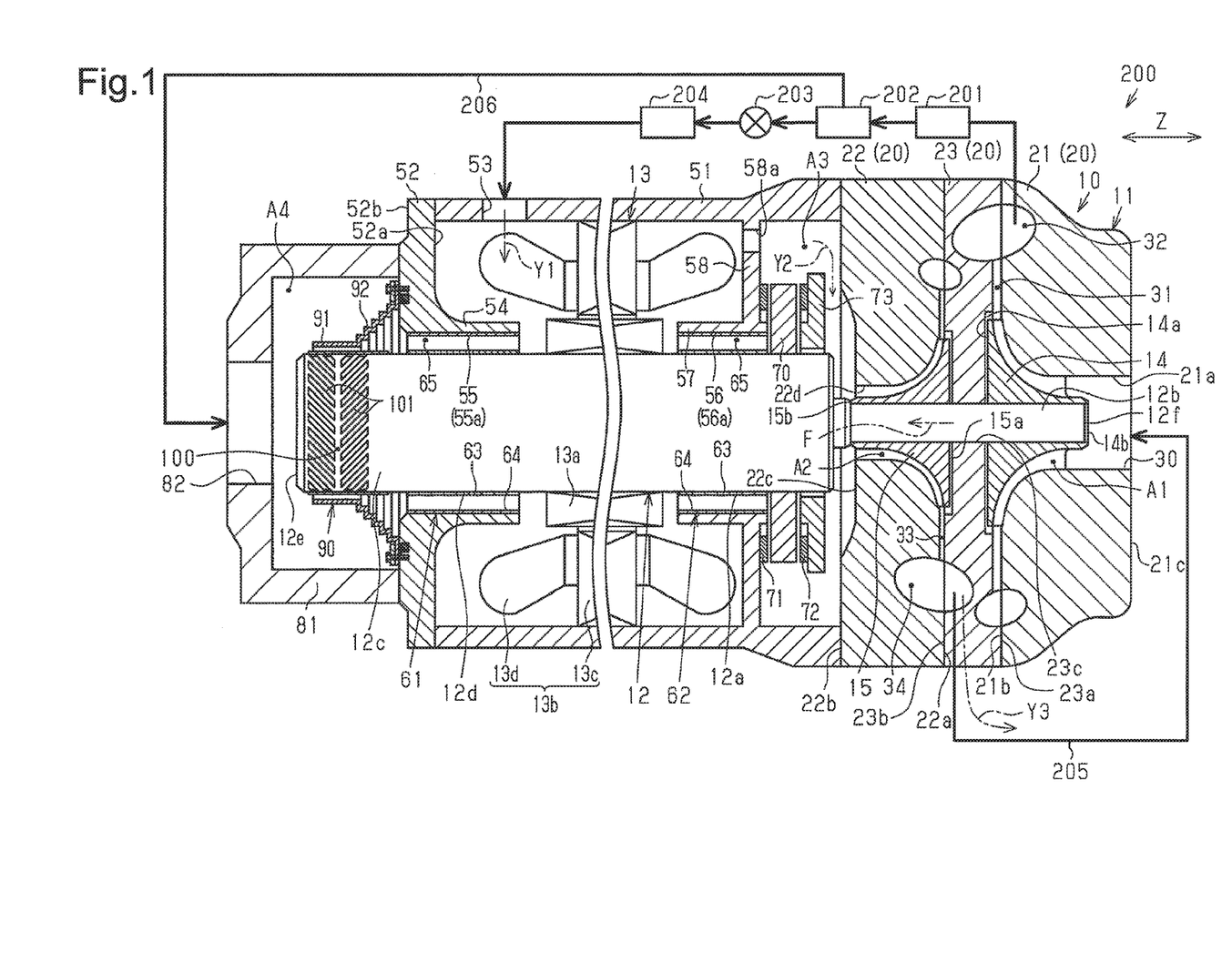
FIG. 1 is a cross-sectional view schematically showing a centrifugal compressor and a vehicle air conditioner.

As shown in FIG. 1, a centrifugal compressor 10 includes a housing 11 that forms the shell of the centrifugal compressor 10. The housing 11 is, for example, entirely tubular.

The centrifugal compressor 10 includes the rotation shaft 12, an electric motor 13 that rotates the rotation shaft 12, and two impellers 14 and 15 coupled to the rotation shaft 12. The rotation shaft 12, the electric motor 13, and the two impellers 14 and 15 are accommodated in the housing 11. The rotation shaft 12 includes a body 12a (body region), a distal end portion 12b (distal end region), and a basal end portion 12c (basal end region). The distal end portion 12b has a smaller diameter than the body 12a. The two impellers 14 and 15 are coupled to the distal end portion 12b. The basal end portion 12c is located at a side opposite to the distal end portion 12b. The basal end portion 12c has the same diameter as the body 12a.

A side corresponding to the distal end portion 12b of the rotation shaft 12 may be simply referred to as the front side, and a side corresponding to the basal end portion 12c of the rotation shaft 12 may be simply referred to as the rear side. In the present embodiment, the distal end portion 12b corresponds to a "first end of the rotation shaft," and the basal end portion 12c corresponds to a "second end of the rotation shaft."

The centrifugal compressor 10 is installed in the vehicle so that an axial direction Z of the rotation shaft 12 corresponds to the horizontal direction. That is, when an axial runout does not occur, the axial direction Z of the rotation shaft 12 corresponds to the horizontal direction. In the following description, unless otherwise noted, the axial direction Z of the rotation shaft 12 means a situation in which there is no axial runout.

The housing 11 includes a front housing 20 that defines a first impeller chamber A1 and a second impeller chamber A2 that accommodate the first impeller 14 and the second impeller 15, respectively. The front housing 20 includes a first part 21, a second part 22, and a middle part 23. The parts 21 to 23 are unitized in a state in which the middle part 23 is held between the first part 21 and the second part 22 in the axial direction Z of the rotation shaft 12.

The first part 21 is tubular and includes a compressor through hole 21a extending through the first part 21 in the axial direction Z of the rotation shaft 12. The first compressor through hole 21a opens in a first end surface 21b and a second end surface 21c of the first part 21 in the axial direction Z of the rotation shaft 12. The first compressor through hole 21a has the form of a substantially truncated cone that gradually decreases in diameter from the opening of the first end surface 21b abutting against the middle part 23 to a middle position in the axial direction Z of the rotation shaft 12. Further, the first compressor through hole 21a is substantially cylindrical and has the same diameter from the middle position to the opening of the second end surface 21c located at a side opposite to the first end surface 21b.

The second part 22 has a tubular shape of which the axial direction is the axial direction Z of the rotation shaft 12. Among a first end surface 22a and a second end surface 22b of the second part 22 in the axial direction Z of the rotation shaft 12, the second end surface 22b that is located at a side opposite to the first end surface 22a abutting against the middle part 23 includes a recess 22c recessed from the second end surface 22b. A second compressor through hole 22d extends through a bottom surface of the recess 22c in the axial direction Z of the rotation shaft 12. The second compressor through hole 22d has the form of a substantially truncated cone that gradually decreases in diameter from the opening of the first end surface 22a abutting against the middle part 23 to a middle position in the axial direction Z of the rotation shaft 12. Further, the first compressor through hole 21a is substantially cylindrical and has the same diameter from the middle position to the opening of the second end surface 22b, which is located at the side opposite to the first end surface 22a.

The middle part 23 is substantially disk-shaped, and a thickness-wise direction of the middle part 23 is the axial direction Z of the rotation shaft 12. The middle part 23 includes a first middle part end surface 23a abutting against the first end surface 21b of the first part 21 and a second middle part end surface 23b that is an end surface located at a side opposite to the first middle part end surface 23a and abuts against the first end surface 22a of the second part 22. The first impeller chamber A1 is defined by an inner surface of the first compressor through hole 21a and the first middle part end surface 23a, and the second impeller chamber A2 is defined by an inner surface of the second compressor through hole 22d and the second middle part end surface 23b. That is, the middle part 23 partitions the first impeller chamber A1 and the second impeller chamber A2.

The middle part 23 includes a middle part through hole 23c through which the rotation shaft 12 is inserted. The distal end portion 12b of the rotation shaft 12 extends through the middle part through hole 23c and traverses the two impeller chambers A1 and A2. The first impeller 14 is coupled to a portion of the distal end portion 12b of the rotation shaft 12 located in the first impeller chamber A1, and the second impeller 15 is coupled to a portion of the distal end portion 12b of the rotation shaft 12 located in the second impeller chamber A2.

The first impeller 14 has the form of a truncated cone that gradually decreases in diameter from a basal end surface 14a of the first impeller 14 toward a distal end surface 14b of the first impeller 14. The first impeller 14 is arranged in the first impeller chamber A1 along the inner surface of the first compressor through hole 21a. In the same manner, the second impeller 15 has the form of a truncated cone that gradually decreases in diameter from a basal end surface 15a of the second impeller 15 toward a distal end surface 15b of the second impeller 15. The second impeller 15 is arranged in the second impeller chamber A2 along the inner surface of the second compressor through hole 22d. The basal end surface 14a of the first impeller 14 and the basal end surface 15a of the second impeller 15 oppose each other.

The front housing 20 (more specifically, first part 21) includes a first suction port 30 through which fluid is drawn. The first suction port 30 is an opening of the first compressor through hole 21a located at a side corresponding to the second end surface 21c. That is, the first compressor through hole 21a forms the first suction port 30 and the first impeller chamber A1. The fluid drawn from the first suction port 30 flows into the first impeller chamber A1.

As shown in FIG. 1, the front housing 20 includes a first diffuser flow passage 31 that is located at the outer side of the first impeller chamber A1 in the radial direction of the rotation shaft 12 and a first discharge chamber 32 that is in communication with the first impeller chamber A1 through the first diffuser flow passage 31. The first diffuser flow passage 31 is annular and surrounds the first impeller 14. The first discharge chamber 32 is located at the outer side of the first diffuser flow passage 31 in the radial direction of the rotation shaft 12 and is in communication with a first discharge port (not shown) formed in the front housing 20.

In the same manner, the front housing 20 includes a second diffuser flow passage 33 that is located at the outer side of the second impeller chamber A2 in the radial direction of the rotation shaft 12 and a second discharge chamber 34 that is in communication with the second impeller chamber A2 through the second diffuser flow passage 33. The fluid in the second discharge chamber 34 is discharged out of a second discharge port (not shown) formed in the front housing 20.

As shown in FIG. 1, the housing 11 includes a motor housing 51 and an end plate 52 that define a motor chamber A3, which accommodates the electric motor 13, in cooperation with the front housing 20.

The motor housing 51 is substantially tubular and an axial direction of the motor housing 51 is the axial direction Z of the rotation shaft 12. The motor housing 51 has two open ends in the axial direction. The end plate 52 is disk-shaped and has a diameter that is the same as an outer diameter of the motor housing 51. A thickness-wise direction of the end plate 52 corresponds to the axial direction of the rotation shaft 12. One of the open ends of the motor housing 51 in the axial direction is joined with the second end surface 22b of the second part 22 of the front housing 20, and the other one of the open ends is joined with a first plate surface 52a of the end plate 52. The motor chamber A3 is defined by the motor housing 51, the second part 22, and the end plate 52. The motor chamber A3 is in communication with the second impeller chamber A2.

The electric motor 13 includes a rotor 13a fixed to the rotation shaft 12 (more specifically, body 12a of rotation shaft 12) and a stator 13b located at the outer side the rotor 13a and fixed to the motor housing 51. The rotor 13a and the stator 13b are arranged coaxially with the rotation shaft 12 and opposed to each other in a radial direction of the rotation shaft 12.

The stator 13b includes a tubular stator core 13c and a coil 13d wound around the stator core 13c. The flow of current to the coil 13d integrally rotates the rotor 13a and the rotation shaft 12.

Further, the motor housing 51 includes a second suction port 53. The second suction port 53 is located in the motor housing 51 at a position closer to the end plate 52 than the electric motor 13.

As shown in FIG. 1, the end plate 52 includes a first boss 54 that extends from the first plate surface 52a toward the front housing 20 and a first support through hole 55 that extends through the end plate 52 in the thickness-wise direction. The body 12a of the rotation shaft 12 is inserted through the first support through hole 55. The first boss 54 is tubular because of the first support through hole 55.

In addition, the motor housing 51 includes a second boss 57 that is arranged at a side of the electric motor 13 opposite to the first boss 54 and a first fixing wall 58 that supports the second boss 57 in the motor housing 51. The second boss 57 includes a second support through hole 56 through which the body 12a of the rotation shaft 12 is inserted. The second boss 57 has a tubular shape of which the axial direction is the axial direction Z of the rotation shaft 12. The second boss 57 opposes the first boss 54 in the axial direction Z of the rotation shaft 12. The first fixing wall 58 projects inward from an inner surface of the motor housing 51 in the radial direction of the rotation shaft 12 and couples the motor housing 51 to the second boss 57.

Radial bearings 61 and 62 that rotationally support the rotation shaft 12 are arranged in the support through holes 55 and 56, more specifically, between inner surfaces 55a and 56a of the support through holes 55 and 56 and an outer circumferential surface 12d of the rotation shaft 12. The two radial bearings 61 and 62 are, for example, dynamic pressure bearings that support the rotation shaft 12 in a state in which the rotation shaft 12 is movable in a direction intersecting the axial direction Z.

For example, the first radial bearing 61 in the first through hole 55 includes a top foil 63 that is arranged outward in the radial direction of the rotation shaft 12 from the outer circumferential surface 12d and a bump foil 64 that is arranged outward from the top foil 63 in the radial direction of the rotation shaft 12. The bump foil 64 has the form of a corrugated plate and elastically supports the top foil 63. The top foil 63 is configured to be movable in the radial direction of the rotation shaft 12. The top foil 63 and the bump foil 64 are spaced apart by a foil gap 65 because of the bump foil 64 that has the form of a corrugated plate to be elastically deformable.

The first radial bearing 61 rotationally supports the rotation shaft 12 in a non-contact state in which the dynamic pressure generated when the rotation shaft 12 rotates forms a gap between the top foil 63 and the outer circumferential surface 12d of the rotation shaft 12. In this case, if the rotation shaft 12 is displaced in a direction orthogonal to the axial direction Z, the top foil 63 is displaced to maintain the gap, and the bump foil 64 elastically deforms to hold the top foil 63 at the changed position. The second radial bearing 62 in the second support through hole 56 functions in the same manner as the first radial bearing 61.

As shown in FIG. 1, the centrifugal compressor 10 includes a plate-like (more specifically, disk-shaped) thrust liner 70 (support plate) fixed to the rotation shaft 12 and two thrust bearings 71 and 72 that receive a thrust force F produced by rotation of the two impellers 14 and 15. The thrust liner 70 and the thrust bearings 71 and 72 are arranged in the motor chamber A3.

The thrust liner 70 is located closer to the front housing 20 than the first fixing wall 58. The thrust liner 70 projects outward from the second boss 57 in the radial direction of the rotation shaft 12.

The two thrust bearings 71 and 72 are, for example, entirely annular and coaxial with the rotation shaft 12. The two thrust bearings 71 and 72 oppose each other in the axial direction Z of the rotation shaft 12 with the thrust liner 70 located in between.

The first thrust bearing 71 is located between the first fixing wall 58 and the thrust liner 70 and fixed to the first fixing wall 58.

The second thrust bearing 72 is fixed to a second fixing wall 73 located between the thrust liner 70 and the front housing 20. The second fixing wall 73 is, for example, annular and coaxial with the rotation shaft 12. The second fixing wall 73 has an inner diameter that is slightly greater than the diameter of the body 12a of the rotation shaft 12 so that the second fixing wall 73 does not contact the rotation shaft 12. The second fixing wall 73 has an outer diameter that is greater than or equal to an outer diameter of the thrust liner 70. A fixing portion (not shown) fixes the second fixing wall 73 to the motor housing 51 or the second part 22 of the front housing 20.

As shown in FIG. 1, a fluid inflow hole 58a extends through the first fixing wall 58 in the axial direction Z of the rotation shaft 12. Fluid is drawn through the fluid inflow hole 58a. Further, the second fixing wall 73 and the front housing 20 are spaced apart from each other in the axial direction Z of the rotation shaft 12, and the second fixing wall 73 and the motor housing 51 are spaced apart from each other in the radial direction of the rotation shaft 12. This allows the fluid in the motor chamber A3 to flow through the fluid inflow hole 58a via the space between the second fixing wall 73 and the front housing 20 or the like into the second impeller chamber A2.

Figure 2:
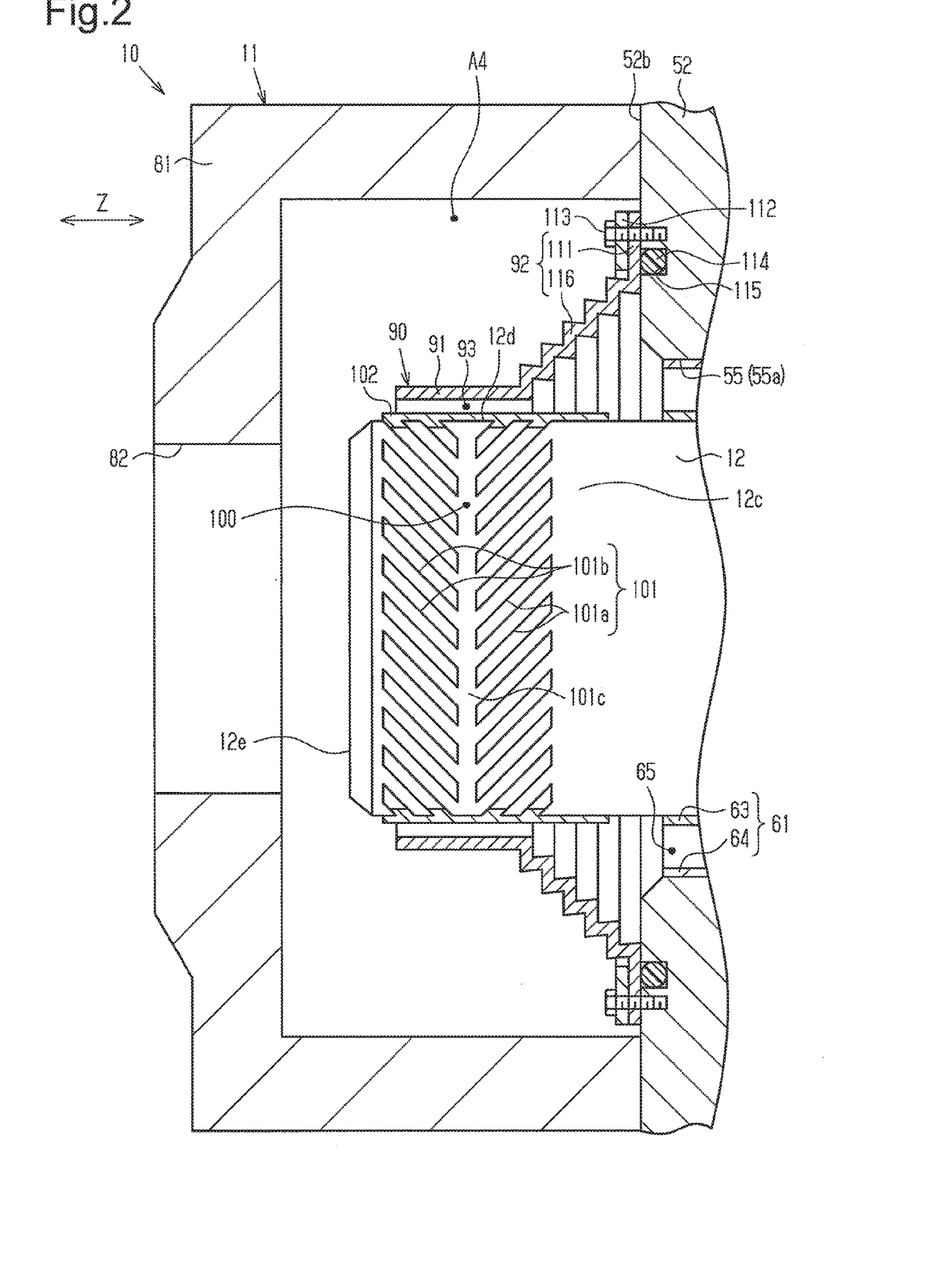
FIG. 2 is an enlarged cross-sectional view showing a basal end accommodation chamber of the centrifugal compressor shown in FIG. 1.

As shown in FIGS. 1 and 2, the rotation shaft 12 is inserted through the first support through hole 55, and the basal end portion 12c of the rotation shaft 12 projects toward the rear (side opposite to two impellers 14 and 15) from the second plate surface 52b of the end plate 52 located at the side opposite to the first plate surface 52a.

The housing 11 includes a rear housing 81 accommodating the basal end portion 12c of the rotation shaft 12 and defining a basal end accommodation chamber A4 that is set to have a higher pressure than the motor chamber A3. The rear housing 81 includes, for example, an open end and a closed end and is tubular. The rear housing 81 is fixed to the end plate 52 in a state in which the open end of the rear housing 81 is joined with the second plate surface 52b of the end plate 52. The basal end accommodation chamber A4 is defined by an inner surface of the rear housing 81 and the second plate surface 52b of the end plate 52. Further, the rear housing 81 includes a third suction port 82 through which fluid having a higher pressure than the pressure of the motor chamber A3 flows.

The motor chamber A3 and the basal end accommodation chamber A4 are partitioned by the end plate 52 and are in communication with each other through the first support through hole 55 of the end plate 52. The rotation shaft 12 traverses both of the motor chamber A3 and the basal end accommodation chamber A4 through the first support through hole 55. In the present embodiment, the end plate 52 corresponds to a "partition wall," the first support through hole 55 corresponds to a "through hole through which the rotation shaft is inserted," the basal end accommodation chamber A4 corresponds to a "first chamber," and the motor chamber A3 corresponds to a "second chamber."

In such a structure, the pressure difference of the basal end accommodation chamber A4 and the motor chamber A3 generates drag force that acts on a basal end surface 12e. The drag force is directed from the basal end surface 12e toward a distal end surface 12f. The drag and the thrust force F, which is directed from the distal end surface 12f of the rotation shaft 12 toward the basal end surface 12e, cancel each other. This allows the thrust force F to be received.

The pressure difference of the basal end accommodation chamber A4 and the motor chamber A3 may induce the fluid in the basal end accommodation chamber A4 to flow through the first support through hole 55 into the motor chamber A3. More specifically, the first radial bearing 61, which includes the foil gap 65, is located between the inner surface 55a of the first support through hole 55 and the outer circumferential surface 12d of the rotation shaft 12. Thus, the fluid in the basal end accommodation chamber A4 may flow through the foil gap 65 into the motor chamber A3.

The centrifugal compressor 10 includes a seal member 90 that restricts the flow of fluid through the first support through hole 55 from the basal end accommodation chamber A4 to the motor chamber A3. The seal member 90 is arranged in the housing 11, more specifically, in the basal end accommodation chamber A4. The seal member 90 is formed by, for example, bending a thin metal plate. An open space that is in communication with the motor chamber A3 through the foil gap 65 is defined in the seal member 90.

As shown in FIG. 2, the seal member 90 includes a gas seal 91 that surrounds the outer circumferential surface 12d of the rotation shaft 12 (more specifically, basal end portion 12c) from the outer side in the radial direction of the rotation shaft 12 and a support 92 that supports the gas seal 91 in a state in which the gas seal 91 is movable in a direction intersecting the axial direction Z of the rotation shaft 12. The gas seal 91 is tubular and slightly larger as a whole than the basal end portion 12c of the rotation shaft 12. The basal end portion 12c of the rotation shaft 12 is covered by the gas seal 91 from the outer side in the radial direction of the rotation shaft 12.

When the rotation shaft 12 is rotating, the gas seal 91 seals the portion between the gas seal 91 and the rotation shaft 12 in a state in which the gas seal 91 is not in contact with the rotation shaft 12. More specifically, rotation of the rotation shaft 12 produces dynamic pressure between the gas seal 91 and the rotation shaft 12. The dynamic pressure keeps the gas seal 91 at a position where a gap 93 is formed between the gas seal 91 and the outer circumferential surface 12d of the rotation shaft 12. The gap 93 is smaller than the foil gap 65. This limits the flow of fluid through the gap 93. That is, the gap 93 functions as a constriction that restricts fluid movement.

In the gas seal 91, the relative positions of the gas seal 91 and the rotation shaft 12 when the gas seal 91 is coaxial with the rotation shaft 12 and the width of the gap 93 (dimension of gap 93 in radial direction of rotation shaft 12) is a predetermined reference value are referred to as the reference positions. The gas seal 91 exhibits the desired sealing performance when the relative positions of the gas seal 91 and the rotation shaft 12 are at the reference positions.

The outer circumferential surface 12d of the rotation shaft 12 includes an opposing region 100 that opposes the gas seal 91. The opposing region 100 includes grooves 101 that restrict the flow of fluid from the basal end accommodation chamber A4 toward the motor chamber A3. The grooves 101 induce a flow that restricts the flow of fluid from the basal end accommodation chamber A4 toward the motor chamber A3 during rotation of the rotation shaft 12. In the present embodiment, the grooves 101 are in the form of, for example, a herringbone. More specifically, the groove 101 includes two spiral grooves 101a and 101b that are inclined in different directions and a land 101c that is arranged between the two spiral grooves 101a and 101b and is free from gaps. When the rotation shaft 12 rotates, the flow of fluid induced by the first spiral grooves 101a strikes the flow of fluid induced by the second spiral grooves 101b in the gap 93 at a location corresponding to the land 101c. This forms a wall of air that restricts the flow of fluid from the basal end accommodation chamber A4 toward the motor chamber A3 and increases the dynamic pressure generated in the gap 93.

A coating layer 102 is applied to the opposing region 100 of the rotation shaft 12. The coating layer 102 satisfies at least one of a condition in which the coating layer 102 has a higher hardness than the rotation shaft 12 and a condition in which the coating layer 102 has a smaller friction coefficient than the outer circumferential surface 12d of the rotation shaft 12. For example, the coating layer 102 is formed from Teflon (registered trademark) or tungsten carbide. In the present embodiment, the coating layer 102 has a higher hardness than the rotation shaft 12 and has a smaller friction coefficient than the outer circumferential surface 12d of the rotation shaft 12.

As shown in FIG. 2, the support 92 includes a coupled portion 111 coupled to the end plate 52. The coupled portion 111 has the form of, for example, a flat ring with an inner diameter that is greater than the outer diameter of the gas seal 91. The coupled portion 111 abuts against the second plate surface 52b of the end plate 52. Further, the centrifugal compressor 10 includes a pressing plate 112 that holds the coupled portion 111 in cooperation with the end plate 52. The coupled portion 111 is held by the pressing plate 112 and the end plate 52 and fixed to the end plate 52 together with the pressing plate 112 by bolts 113 serving as fasteners.

The centrifugal compressor 10 includes an O-ring 114 that seals a portion between the coupled portion 111 and the second plate surface 52b of the end plate 52. The O-ring 114 is fitted into a ring groove 115 formed at a position of the second plate surface 52b of the end plate 52 that is located inward from the bolts 113 in the radial direction of the rotation shaft 12. The O-ring 114 is compressed by the coupled portion 111.

The support 92 includes a connection portion 116 that connects the coupled portion 111 to the gas seal 91. The connection portion 116 is tubular and accordion-like (bellows-shaped). More specifically, the connection portion 116 has a tubular shape that gradually increases in diameter from the gas seal 91 toward the coupled portion 111 and is bent in a zigzagged manner. The connection portion 116 is coaxial with the rotation shaft 12. The connection portion 116 connects an inner circumferential end of the coupled portion 111 to the one of the two axial ends of the gas seal 91 that corresponds to the end plate 52. In the present embodiment, the gas seal 91, the connection portion 116, and the coupled portion 111 are integrally formed. The connection portion 116 has a tubular shape having an accordion-like structure in which projections and grooves extending in the circumferential direction are alternately arranged in the axial direction Z of the rotation shaft 12.

The structure that generates a pressure difference between the basal end accommodation chamber A4 and the motor chamber A3 will now be described.

As shown in FIG. 1, the centrifugal compressor 10 forms part of a vehicle air conditioner 200. Thus, the fluid subject to compression by the centrifugal compressor in the present embodiment is a refrigerant.

The air conditioner 200 includes a condenser 201, a gas-liquid separator 202, an expansion valve 203, and an evaporator 204 in addition to the centrifugal compressor 10. The condenser 201, the gas-liquid separator 202, the expansion valve 203, and the evaporator 204 are connected by pipes. Further, the condenser 201 is connected to the first discharge chamber 32 through the first discharge port, and the evaporator 204 is connected to the second suction port 53.

In addition, the air conditioner 200 includes a pipe 205 that connects the second discharge chamber 34 to the first suction port 30 through the second discharge port. Further, the air conditioner 200 includes a bypass pipe 206 that connects the gas-liquid separator 202 to the third suction port 82 in addition to a pipe that connects the gas-liquid separator 202 and the expansion valve 203.

The flow of fluid in the centrifugal compressor 10 and the vehicle air conditioner 200 will now be described as the operation of the present embodiment.

When rotation of the rotation shaft 12 rotates the two impellers 14 and 15, as shown by arrow Y1 in FIG. 1, a relatively low-pressure fluid (hereinafter referred to as low-pressure fluid) discharged out of the evaporator 204 is drawn from the second suction port 53. In this case, the motor chamber A3 serves as a low-pressure chamber. The fluid drawn into the motor chamber A3 flows through the fluid inflow hole 58a and the like toward the second impeller chamber A2 (refer to arrow Y2 of FIG. 1). The centrifugal effect of the second impeller 15 forces the low-pressure fluid from the second impeller chamber A2 through the second diffuser flow passage 33 to the second discharge chamber 34 and out of the second discharge chamber 34. The pressure of the fluid in the second discharge chamber 34 is higher than the pressure of the low-pressure fluid. The fluid discharged out of the second discharge chamber 34 is referred to as the medium-pressure fluid.

As shown by arrow Y3 in FIG. 1, the medium-pressure fluid is discharged out of the second discharge chamber 34 and drawn into the first suction port 30 through the pipe 205. The centrifugal effect of the first impeller 14 forces the medium-pressure fluid from the first impeller chamber A1 through the first diffuser flow passage 31 to the first discharge chamber 32 and out of the first discharge chamber 32. The pressure of the fluid in the first discharge chamber 32 is higher than the pressure of the medium-pressure fluid. The fluid discharged out of the first discharge chamber 32 is referred to as the high-pressure fluid.

The high-pressure fluid is supplied from the first discharge chamber 32 to the condenser 201. Some of the high-pressure fluid is supplied through the bypass pipe 206 to the third suction port 82. Thus, the basal end accommodation chamber A4 is filled with the high-pressure fluid. In contrast, the motor chamber A3 is filled with the low-pressure fluid. Accordingly, the pressure of the basal end accommodation chamber A4 is higher than the pressure of the motor chamber A3. Thus, a drag force against the thrust force F is applied to the rotation shaft 12. More specifically, the pressing force produced by the pressure difference of the basal end accommodation chamber A4 and the motor chamber A3 is applied to the basal end surface 12e of the rotation shaft 12.

In this case, the pressure difference of the basal end accommodation chamber A4 and the motor chamber A3 induces the high-pressure fluid in the basal end accommodation chamber A4 to act to flow through the first support through hole 55 from the basal end accommodation chamber A4 toward the motor chamber A3. In the present embodiment, the seal member 90 restricts the flow of fluid. This maintains a state in which an outer region of the seal member 90 is filled with the high-pressure fluid and a state in which an inner region of the seal member 90 is filled with the low-pressure fluid.

Figure 3:
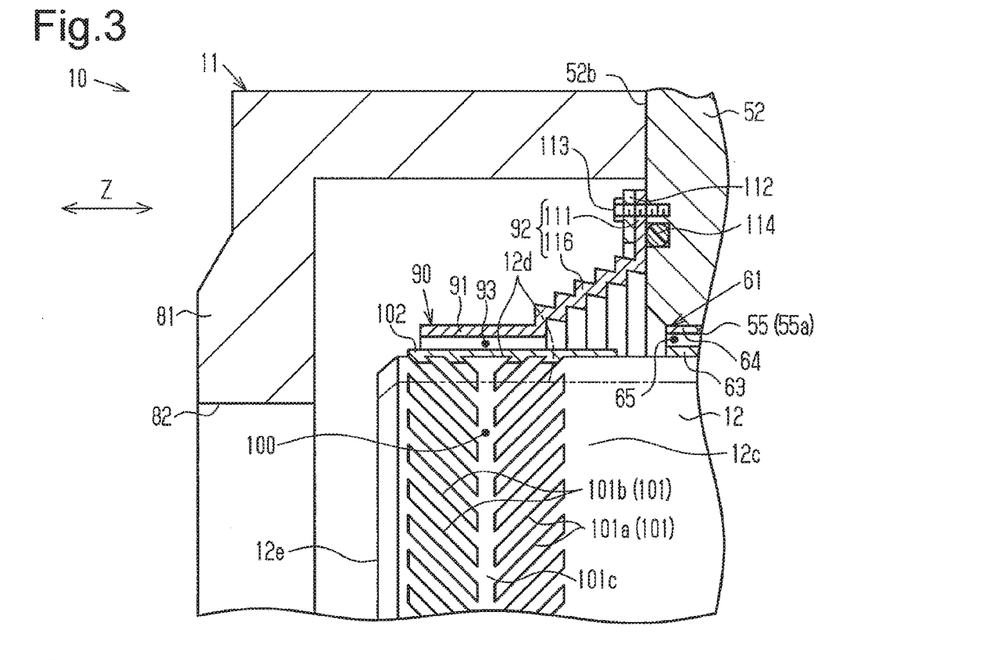
FIG. 3 is a cross-sectional view schematically showing a seal member of the centrifugal compressor shown in FIG. 1 when an axial runout of a rotation shaft occurs.

For one reason or another, an axial runout may occur with the rotation shaft 12. For example, as shown in FIG. 3, the rotation shaft 12 may be displaced in a direction orthogonal to the axial direction Z of the rotation shaft 12 as one type of axial runout of the rotation shaft 12. In this case, the accordion-like connection portion 116 deforms in correspondence with the displacement of the rotation shaft 12 and displaces the gas seal 91. Thus, even when the rotation shaft 12 is displaced, the relative positions of the gas seal 91 and the rotation shaft 12 are maintained at the reference positions.

Figure 4:
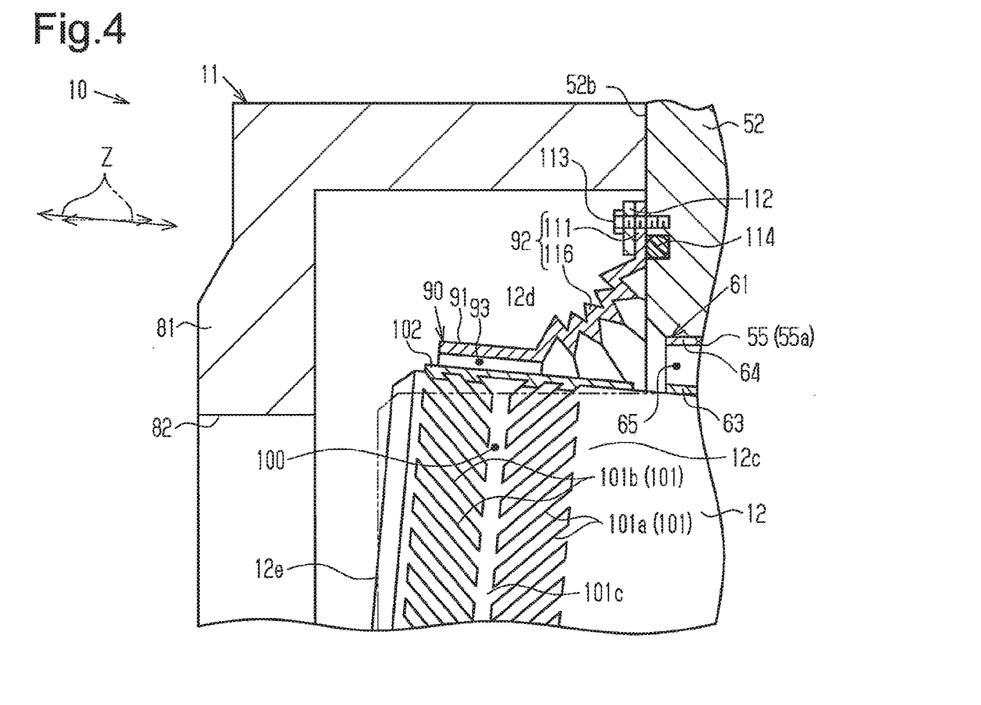
FIG. 4 is a cross-sectional view schematically showing the seal member of the centrifugal compressor shown in FIG. 1 when an axial runout of the rotation shaft occurs.

Further, as shown in FIG. 4, the rotation shaft 12 may be displaced in the axial direction Z, more specifically, displaced and inclined relative to the horizontal direction as one type of an axial runout of the rotation shaft 12. In this case, the accordion-like connection portion 116 deforms in correspondence with the displacement of the rotation shaft 12 and displaces the gas seal 91. Thus, even when the rotation shaft 12 is displaced in the axial direction Z, the relative positions of the gas seal 91 and the rotation shaft 12 are maintained at the reference positions.

The present embodiment has the advantages described below.

(1) The centrifugal compressor 10 includes the rotation shaft 12, the impellers 14 and 15 that compress fluid when rotated by the rotation shaft 12, and the housing 11 that accommodates the rotation shaft 12 and the impellers 14 and 15. The housing 11 includes the basal end accommodation chamber A4 serving as the first chamber that accommodates the basal end portion 12c of the rotation shaft 12 and the motor chamber A3 serving as the second chamber that accommodates the electric motor 13. The housing 11 includes the end plate 52 serving as the partition wall that partitions the basal end accommodation chamber A4 and the motor chamber A3. The rotation shaft 12 traverses the basal end accommodation chamber A4 and the motor chamber A3 through the first support through hole 55 of the end plate 52.

In such a structure, the housing 11 includes the seal member 90 that restricts the flow of fluid from the basal end accommodation chamber A4 to the motor chamber A3 through the first support through hole 55. The seal member 90 includes the gas seal 91. Rotation of the rotation shaft 12 generates dynamic pressure that surrounds the outer circumferential surface 12d of the rotation shaft 12 with the gas seal 91 from the outer side in the radial direction of the rotation shaft 12 in a non-contact state with the gap 93 formed between the gas seal 91 and the outer circumferential surface 12d of the rotation shaft 12. Further, the seal member 90 includes the support 92 that supports the gas seal 91 in a state in which the gas seal 91 is movable in the direction intersecting the axial direction Z of the rotation shaft 12.

In such a structure, the gap 93 formed between the gas seal 91 and the outer circumferential surface 12d of the rotation shaft 12 functions as the constriction that restricts the flow of fluid. This restricts the flow of fluid from the high-pressure basal end accommodation chamber A4 to the low-pressure motor chamber A3. The gas seal 91 is movable by the support 92 in the direction intersecting the axial direction Z of the rotation shaft 12. Thus, when an axial runout occurs with the rotation shaft 12, the gas seal 91 is displaced so that the relative positions of the gas seal 91 and the rotation shaft 12 remain unchanged (more specifically, reference positions are maintained). That is, the gas seal 91 follows the axial runout of the rotation shaft 12. This limits decreases in the sealing performance of the seal member 90 that result from the axial runout of the rotation shaft 12.

For example, an elastically deformable contact-type seal member that contacts the outer circumferential surface 12*d* of the rotation shaft 12 may be used as the seal member. In this case, the contact-type seal member may wear. In this regard, the seal member 90 of the present embodiment functions as a seal in a state in which the seal member 90 is not in contact with the outer circumferential surface 12*d* of the rotation shaft 12 and thus limits wear. However, in such a non-contact type seat structure, when an axial runout of the rotation shaft 12 occurs, the rotation shaft 12 may contact the gas seal 91. Further, the size of the gap 93 may become non-uniform. This may lower the sealing performance.

In the present embodiment, the support 92 limits changes in the relative positions of the gas seal 91 and the rotation shaft 12 that are caused by the axial runout of the rotation shaft 12. This resolves the problems of the non-contact type seal member. Thus, even when the axial runout of the rotation shaft 12 occurs, the leakage of fluid is limited through the first support through hole 55 from the basal end accommodation chamber A4 to the motor chamber A3.

(2) The support 92 includes the coupled portion 111, which is coupled to the end plate 52, and the tubular, accordion-like connection portion 116, which connects the coupled portion 111 to the gas seal 91. In such a structure, advantage (1) is obtained without forming the connection portion 116 from a material that elastically deforms more easily than the gas seal 91.

(3) The connection portion 116 gradually increases in diameter from the gas seal 91 toward the coupled portion 111. In such a structure, when an axial runout of the rotation shaft 12 deforms the accordion-like connection portion 116, contact of the connection portion 116 with the rotation shaft 12 is limited. Thus, when the axial runout of the rotation shaft 12 occurs, problems caused when the connection portion 116 contacts the rotation shaft 12 such as wear of the connection portion 116 are avoided.

(4) The seal member 90 is arranged in the basal end accommodation chamber A4. This resolves problems caused by the employment of the accordion-like connection portion 116.

More specifically, the accordion-like connection portion 116 can be expanded and contracted in the axial direction Z of the rotation shaft 12 because of its characteristics. Thus, if the connection portion 116 is arranged in the motor chamber A3, the connection portion 116 receives force in a direction in which the connection portion 116 is expanded by the pressure difference of the basal end accommodation chamber A4 and the motor chamber A3. This expands the connection portion 116 and adversely affects the deformation function of the connection portion 116.

In the present embodiment, the connection portion 116 is arranged in the basal end accommodation chamber A4. In this case, the connection portion 116 receives force in a direction in which the connection portion 116 is contracted by the pressure difference of the basal end accommodation chamber A4 and the motor chamber A3. This limits the expansion of the connection portion 116 resulting from the pressure difference.

(5) The opposing region 100 in the outer circumferential surface 12*d* of the rotation shaft 12 that opposes the gas seal 91 includes the grooves 101 formed to restrict the flow of fluid from the basal end accommodation chamber A4 toward the motor chamber A3. More specifically, the grooves 101 induce a flow that restricts the flow of fluid from the basal end accommodation chamber A4 toward the motor chamber A3 when the rotation shaft 12 rotates. This further increases the sealing performance. In addition, the flow induced by the grooves 101 increases the dynamic pressure generated at the gap 93 between the gas seal 91 and the rotation shaft 12 when the rotation shaft 12 rotates. This limits changes in the relative positions of the rotation shaft 12 and the gas seal 91 in a preferred manner. Thus, the contact of the rotation shaft 12 and the gas seal 91 caused by an axial runout of the rotation shaft 12 is further limited.

(6) The opposing region 100 includes the coating layer 102 having a higher hardness than the rotation shaft 12. Such a structure reduces wear of the rotation shaft 12 caused by the contact (sliding) of the opposing region 100 and the gas seal 91.

More specifically, since the gas seal 91 is of a dynamic-pressure type, the gas seal 91 is in contact with the opposing region 100 when the rotation shaft 12 does not rotate. Thus, in an initial rotation stage of the rotation shaft 12, the gas seal 91 and the opposing region 100 slide against each other. In the present embodiment, the coating layer 102 is formed on the opposing region 100. This reduces wear of the rotation shaft 12 caused by the sliding of the gas seal 91 and the opposing region 100.

(7) The coating layer 102 has a smaller friction coefficient than the outer circumferential surface 12*d* of the rotation shaft 12. This allows for smooth sliding of the gas seal 91 and the opposing region 100. Thus, the wear of the gas seal 91 caused by the sliding of the gas seal 91 and the opposing region 100 is reduced.

(8) The rotation shaft 12 includes the distal end portion 12*b* coupled to the two impellers 14 and 15 and the basal end portion 12*c* arranged in the basal end accommodation chamber A4. The centrifugal compressor 10 includes the electric motor 13 accommodated in the motor chamber A3 to rotate the rotation shaft 12 and the thrust bearings 71 and 72 accommodated in the motor chamber A3 to receive the thrust force F produced by rotation of the two impellers 14 and 15. In such a structure, the thrust bearings 71 and 72 are arranged in the motor chamber A3 that has a relatively low pressure. This reduces windage losses of the thrust bearings 71 and 72. Further, the pressure difference of the basal end accommodation chamber A4 and the motor chamber A3 applies a drag force against the thrust force F to the rotation shaft 12. This reduces the thrust force F received by the thrust bearings 71 and 72 and thus reduces the thrust bearings 71 and 72 in size.

The fluid flowing from the basal end accommodation chamber A4 to the motor chamber A3 decreases the drag force and the efficiency of the air conditioner. In this regard, the present embodiment includes the seal member 90 that restricts the flow of fluid from the basal end accommodation chamber A4 to the motor chamber A3. This limits decreases in the drag force and the like. Thus, the thrust force F is received in a preferred manner with the pressure difference of the basal end accommodation chamber A4 and the motor chamber A3.

(9) The housing 11 includes the radial bearings 61 and 62 that rotationally support the rotation shaft 12 in a state in which the rotation shaft 12 is movable in a direction intersecting the axial direction Z. Such a structure allows the rotation shaft 12 to be rotationally supported even when an axial runout of the rotation shaft 12 occurs. This reduces the adverse effects on the rotation of the rotation shaft 12 that are caused when the axial runout of the rotation shaft 12 occurs.

The above embodiment may be modified as described below.

The connection portion may be formed from a material that elastically deforms more easily than the gas seal 91, for example, rubber. In this case, the connection portion does not have to be accordion-like. In short, the support 92 may be of any structure as long as it supports the gas seal 91 in the state in which the gas seal 91 is movable in the direction intersecting the axial direction Z of the rotation shaft 12 while defining an open space in the support 92.

The diameter of the connection portion 116 may be fixed regardless of location in the axial direction Z of the rotation shaft 12.

The seal member 90 may be located in the motor chamber A3. In this case, a boss projects rearward from the second plate surface 52b of the end plate 52 instead of the first boss 54, and the first radial bearing 61 is arranged between the boss and the basal end portion 12c of the rotation shaft 12.

The grooves 101 may be of any structure as long as they restrict the flow of fluid from the basal end accommodation chamber A4 to the motor chamber A3. For example, the grooves 101 may be shaped to induce a flow from the motor chamber A3 to the basal end accommodation chamber A4 when the rotation shaft 12 rotates. In this case, the flows in reverse directions strike each other in the first support through hole 55. This increases the dynamic pressure.

The grooves 101 may be omitted. Even in this case, dynamic pressure is generated between the gas seal 91 and the outer circumferential surface 12d of the rotation shaft 12. This restricts the flow of fluid from the basal end accommodation chamber A4 to the motor chamber A3 to a certain extent.

The coating layer 102 may be omitted.

The first chamber and the second chamber are not limited to the basal end accommodation chamber A4 and the motor chamber A3, respectively. For example, in a structure in which the housing 11 includes a thrust chamber that accommodates the thrust bearings 71 and 72 and a partition wall that partitions the thrust chamber and the motor chamber A3 and includes a through hole through which the rotation shaft 12 is inserted, the seal member 90 may restrict fluid movement between the thrust chamber and the motor chamber.

The two thrust bearings 71 and 72 and the thrust liner 70 may be arranged in the basal end accommodation chamber A4.

The two thrust bearings 71 and 72 may be omitted. In this case, the thrust liner 70 and the second fixing wall 73 may be omitted.

The radial bearings 61 and 62 may be of any structure.

The second fixing wall 73 may be an annular wall, like the first fixing wall 58, extending inward from the inner surface of the motor housing 51 in the radial direction of the rotation shaft 12. In this case, like the first fixing wall 58, the second fixing wall 73 may include a through hole through which fluid flows.

The centrifugal compressor 10 may be configured so that the first suction port 30 and the third suction port 82 are both supplied with the medium-pressure fluid, which is discharged out of the second discharge chamber 34, through pipes or the like. In this case, the basal end accommodation chamber A4 has the medium pressure.

Figure 5:
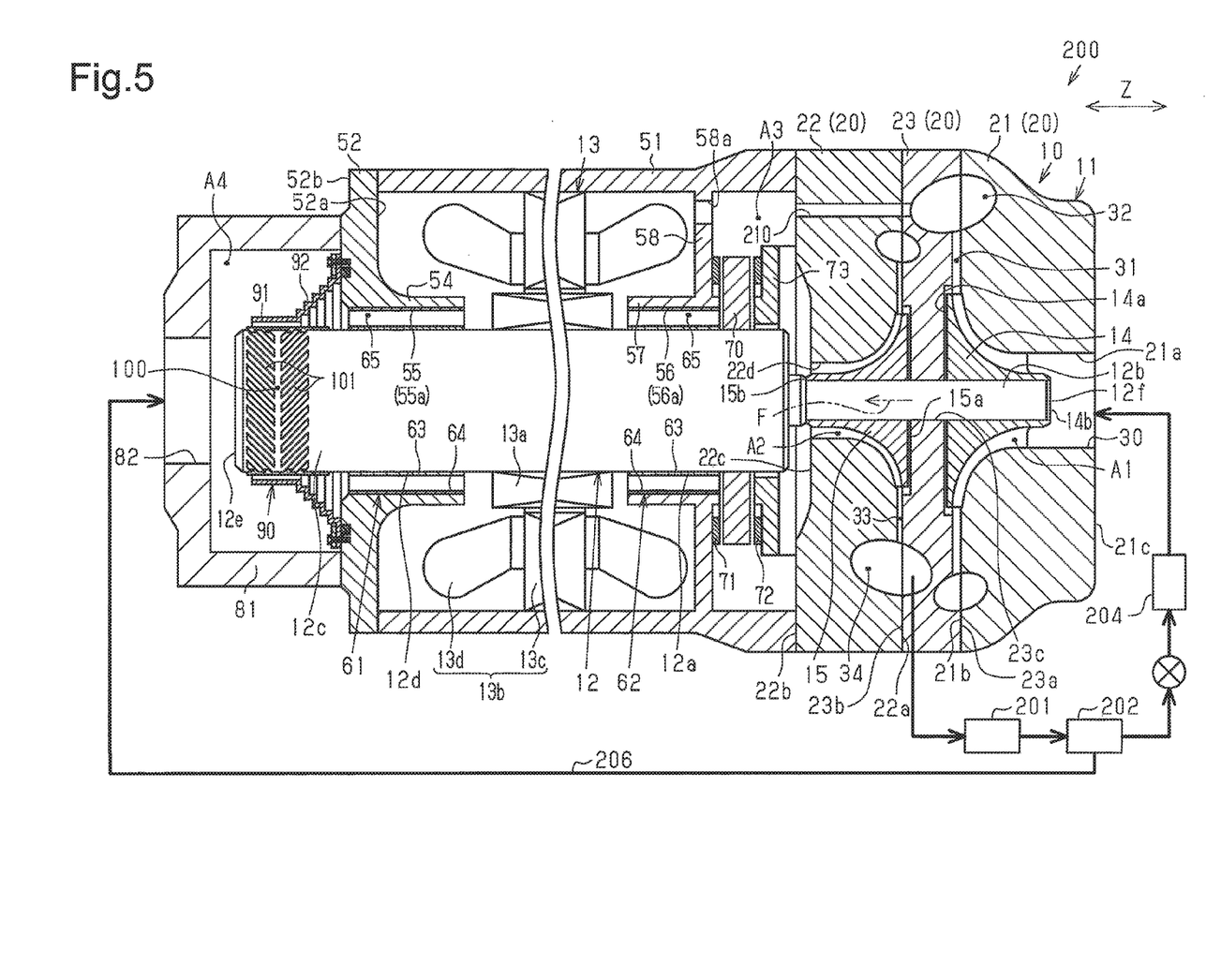
FIG. 5 is a cross-sectional view schematically showing another example of a vehicle air conditioner.

The first suction port 30 may be supplied with a low-pressure fluid. More specifically, as shown in FIG. 5, the vehicle air conditioner 200 is configured so that the low-pressure fluid discharged out of the evaporator 204 is supplied to the first suction port 30 through pipes and some of the fluid discharged out of the second discharge chamber 34 is supplied to the third suction port 82 through the condenser 201 and the gas-liquid separator 202. The housing 11 (more specifically, front housing 20) includes a medium-pressure port 210 through which the first discharge chamber 32 and the motor chamber A3 are in communication with each other. The medium-pressure port 210 extends through the second part 22 and the middle part 23 in the axial direction Z. This example does not include the second suction port 53.

In such a structure, fluid sequentially flows from the first suction port 30 to the first impeller chamber A1, the first diffuser flow passage 31, the first discharge chamber 32, the medium-pressure port 210, the motor chamber A3, the second impeller chamber A2, the second diffuser flow passage 33, and the second discharge chamber 34. In this case, the motor chamber A3 is filled with the medium-pressure fluid. Further, the high-pressure fluid is discharged out of the second discharge chamber 34. Thus, the basal end accommodation chamber A4 is filled with the high-pressure fluid. This produces the pressure difference of the basal end accommodation chamber A4 and the motor A3 and thus generates a drag force against the thrust force F.

One of the two impellers 14 and 15 may be omitted. In this case, the diffuser flow passage and the discharge chamber that correspond to the omitted impeller may be omitted.

The basal end portion 12c of the rotation shaft 12 may have a smaller diameter than the body 12a. Further, the distal end portion 12b of the rotation shaft 12 may have the same diameter as the body 12a.

The centrifugal compressor 10 does not have to be installed in a vehicle.

The centrifugal compressor 10 of the embodiment is used as part of the air conditioner 200. Instead, the centrifugal compressor 10 may be used for other purposes. For example, when the vehicle is a fuel cell vehicle (FCV) including a fuel cell, the centrifugal compressor 10 may be used with a supply device that supplies air to the fuel cell. In short, the fluid subject to compression may be a refrigerant or air, and the fluid device is not limited to the air conditioner.

The invention claimed is:

1. A centrifugal compressor comprising:
   a rotation shaft;
   an impeller that compresses fluid when rotated by rotation of the rotation shaft;
   a housing that accommodates the rotation shaft and the impeller, the housing including
      a first chamber,
      a second chamber of which pressure is lower than the first chamber, and
      a partition wall that partitions the first chamber and the second chamber, wherein the partition wall includes a through hole through which the rotation shaft is inserted; and
   a seal member arranged in the housing, wherein the seal member restricts a flow of fluid through the through hole from the first chamber toward the second chamber, wherein the rotation shaft traverses both of the first chamber and the second chamber through the through hole, and the seal member includes a gas seal and a support, wherein when the rotation shaft is rotating, the gas seal surrounds an outer circumferential surface of the rotation shaft from an outer side in a radial direction of the rotation shaft in a non-contact state in which dynamic pressure generated during the rotation of the rotation shaft forms a gap between the gas seal and the outer circumferential surface of the rotation shaft, the support supports the gas seal in a state in which the gas seal is movable in a direction intersecting an axial direction of the rotation shaft, the support includes a coupled portion coupled to the partition wall, and a connection portion that connects the coupled portion to the gas seal, wherein the connection portion is tubular and accordion-like, and the seal member is arranged in the first chamber.

2. The centrifugal compressor according to claim 1, wherein the connection portion gradually increases in diameter from the gas seal toward the coupled portion.

3. The centrifugal compressor according to claim 1, wherein the outer circumferential surface of the rotation shaft includes an opposing region that opposes the gas seal, and the opposing region includes a groove configured to induce a flow that restricts the flow of fluid from the first chamber toward the second chamber during the rotation of the rotation shaft.

4. The centrifugal compressor according to claim 1, wherein the outer circumferential surface of the rotation shaft includes an opposing region that opposes the gas seal, and the opposing region includes a coating layer having a higher hardness than the rotation shaft.

5. The centrifugal compressor according to claim 1, wherein the outer circumferential surface of the rotation shaft includes an opposing region that opposes the gas seal, and the opposing region includes a coating layer having a smaller friction coefficient than the outer circumferential surface of the rotation shaft.

6. The centrifugal compressor according to claim 1, wherein the rotation shaft includes a first end to which the impeller is coupled, and a second end located in the first chamber, and the centrifugal compressor includes an electric motor accommodated in the second chamber, wherein the electric motor rotates the rotation shaft, and a thrust bearing accommodated in the second chamber, wherein the thrust bearing receives a thrust force produced by rotation of the impeller.

7. The centrifugal compressor according to claim 1, further comprising a radial bearing arranged in the housing, wherein the radial bearing rotationally supports the rotation shaft in a state in which the rotation shaft is movable in the direction intersecting the axial direction of the rotation shaft.

* * * * *